US008581816B2

(12) United States Patent  
Park et al.

(10) Patent No.: US 8,581,816 B2  
(45) Date of Patent: Nov. 12, 2013

(54) LIQUID CRYSTAL DISPLAY AND DRIVING METHOD THEREOF

(75) Inventors: Kyung-Ho Park, Cheonan-si (KR); So-Young Kim, Jeju-si (KR); Si Hyun Ahn, Cheonan-si (KR); Dong Hee Shin, Seoul (KR); Hyung-Jun Park, Seongnam-si (KR); Soo-Hyun Kim, Chungju-si (KR)

(73) Assignee: Samsung Display Co., Ltd. (KR)

( * ) Notice: Subject to any disclaimer, the term of this patent is extended or adjusted under 35 U.S.C. 154(b) by 291 days.

(21) Appl. No.: 12/985,404

(22) Filed: Jan. 6, 2011

(65) Prior Publication Data

US 2012/0062523 A1 Mar. 15, 2012

(30) Foreign Application Priority Data

Sep. 13, 2010 (KR) ........................ 10-2010-0089405

(51) Int. Cl.
G09G 3/34 (2006.01)
(52) U.S. Cl.
USPC ................. 345/87; 345/89; 345/92; 345/204
(58) Field of Classification Search
USPC .............................................. 345/87–92, 204
See application file for complete search history.

(56) References Cited

U.S. PATENT DOCUMENTS

| 8,179,349 | B2 * | 5/2012 | Liao et al. ........................ 345/89 |
| 8,248,343 | B2 * | 8/2012 | Huang et al. .................... 345/89 |
| 2008/0252624 | A1 * | 10/2008 | Jang et al. ...................... 345/204 |
| 2009/0135323 | A1 * | 5/2009 | Yang et al. ....................... 349/37 |
| 2009/0195719 | A1 * | 8/2009 | Kim et al. ........................ 349/39 |
| 2009/0225018 | A1 * | 9/2009 | Kim ................................ 345/90 |
| 2011/0115998 | A1 * | 5/2011 | Liao et al. ........................ 349/38 |
| 2011/0205461 | A1 * | 8/2011 | Chen et al. ....................... 349/38 |

* cited by examiner

Primary Examiner — Koosha Sharifi-Tafreshi
(74) Attorney, Agent, or Firm — Cantor Colburn LLP

(57) ABSTRACT

A liquid crystal display, the liquid crystal display comprises a plurality of gate lines which includes a first gate line, a transformation gate line, and a second gate line; a data line; and a pixel, wherein the pixel includes a first liquid crystal capacitor which includes a first sub-pixel electrode and a common electrode and a second liquid crystal capacitor which includes a second sub-pixel electrode and a common electrode; a first switching element connected to the first gate line, the data line, and the first sub-pixel electrode; a second switching element connected to the first gate line, the data line, and the second sub-pixel electrode; a third switching element connected to the transformation gate line and the second switching element; a transformation capacitor which includes a first terminal connected to the second gate line and a second terminal connected to the third switching element; and a first period where a gate-on voltage Von is applied to the first gate line and a second period where the gate-on voltage Von is applied to the transformation gate line do not overlap each other and, a gate-off voltage Voff is applied to the second gate line during the second period.

19 Claims, 12 Drawing Sheets

LIQUID CRYSTAL DISPLAY AND DRIVING METHOD THEREOF

This application claims priority to Korean Patent Application No. 10-2010-0089405, filed on Sep. 13, 2010, and all the benefits accruing therefrom under 35 U.S.C. §119, the content of which in its entirety is herein incorporated by reference.

BACKGROUND OF THE INVENTION (a) Field of the Invention

The present invention generally relates to a liquid crystal display and a driving method thereof.

(b) Description of the Related Art

A liquid crystal display ("LCD") is a widely used type of flat panel displays. The LCD typically includes two sheets of display panels which a field generating electrode, such as a pixel electrode and a common electrode, for example, is formed thereon and a liquid crystal layer is formed therebetween. The LCD generates an electric field in a liquid crystal layer by applying voltage to a field generating electrode, determines a direction of liquid crystal molecules of a liquid crystal layer, and controls polarization of incident light, thereby displaying images.

An LCD generally includes a pixel including a switching element constituted by a thin film transistor ("TFT") that is a three-terminal element, a display panel including a display signal line such as a gate line and a data line, for example.

A liquid crystal layer typically includes a liquid crystal material having refractive anisotropy. Due to the refractive anisotropy of the liquid crystal material, a change in color and a change in contrast become substantially large according to a viewing angle. Thus, when a viewing angle is smaller, side visibility may be substantially degraded compared with front visibility. In order to solve the problem, a method of dividing one pixel electrode into two sub-pixel electrodes and applying different voltages to the two sub-pixel electrodes, for example, has been proposed. Each sub-pixel electrode is connected to a first switching element that switches applied voltage.

In order to apply different voltages to the two sub-pixel electrodes, one of two sub-pixel electrodes is connected to a transformation capacitor through a second switching element that is a three terminal element.

The first switching element and the second switching element may be controlled using a gate line. However, when a period where the first switching element is turned-on and a period where the second switching element is turned-on overlap with each other, there may be a problem of charging the sub-pixel electrode connected to the second switching element. Further, when signal lines other than gate lines are implemented on a display panel to control the second switching element, transmittance of the display panel is reduced, such that there is a problem of substantially degrading a value of commodities.

BRIEF SUMMARY OF THE INVENTION

The present invention has been made in an effort to provide a liquid crystal display ("LCD") and a driving method thereof capable of substantially improving visibility while securing transmittance in the LCD wherein one pixel of the LCD includes two sub-pixels.

An exemplary embodiment of the present invention provides an LCD including a plurality of gate lines including a first gate line, a transformation gate line, and a second gate line; a data line; a pixel wherein the pixel includes a first liquid crystal capacitor including a first sub-pixel electrode and a common electrode and a second liquid crystal capacitor including a second sub-pixel electrode and a common electrode; a first switching element connected to the first gate line, the data line, and the first sub-pixel electrode; a second switching element connected to the first gate line, the data line, and the second sub-pixel electrode; a third switching element connected to the transformation gate line and the second switching element; a transformation capacitor including a first terminal connected to the second gate line and a second terminal connected to the third switching element; and a first period where a gate-on voltage Von is applied to the first gate line and a second period where the gate-on voltage Von is applied to the transformation gate line do not overlap each other, and a gate-off voltage Voff is applied to the second gate line during the second period.

In one exemplary embodiment, the second period may be subsequent to the first period within a frame period.

In one exemplary embodiment, the first switching element and the second switching element may be turned-on in the first period, such that the first liquid crystal capacitor and the second liquid crystal capacitor are charged to a first voltage.

In one exemplary embodiment, the third switching element may be turned-on in the second period, such that the second liquid crystal capacitor and the transformation capacitor share charge.

In one exemplary embodiment, the second liquid crystal capacitor may be charged to the second voltage after the second period.

In one exemplary embodiment, the second voltage may be substantially lower than the first voltage.

In one exemplary embodiment, the second gate line and the first gate line are consecutive gate lines.

In one exemplary embodiment, the second gate line may be a gate line previous to the first gate line.

In one exemplary embodiment, the second gate line may be a gate line subsequent to the first gate line.

In one exemplary embodiment, periods of consecutive gate lines of the plurality of gate lines to which the gate-on voltage Von is each applied may overlap each other.

In one exemplary embodiment, a period where the gate-on voltage is applied to each of the plurality of gate lines may be 1H and the periods of the consecutive gate lines to which the gate-on voltage Von is each applied may overlap by ⅔H.

In one exemplary embodiment, the first gate line may be an i-th gate line, the second gate line may be an i−1-th gate line, and the transformation gate line may be an i+4-th gate line.

In one exemplary embodiment, the first gate line may be an i-th gate line, the second gate line may be an i+1-th gate line, the transformation gate line may be an i+4-th gate line.

In one exemplary embodiment, a gate signal applied to the plurality of gate lines may be generated based on first to sixth clock signals and the first to sixth clock signals may have a 2H period and sequentially have a phase difference of about 60°.

Another exemplary embodiment according to the present invention provides a driving method of an LCD including a plurality of gate lines including a first gate line, a transformation gate line, and a second gate line; a data line, and a pixel, wherein the pixel includes a first liquid crystal capacitor including a first sub-pixel electrode and a common electrode and a second liquid crystal capacitor including a second sub-pixel electrode and a common electrode; a first switching element connected to the first gate line, the data line, and the first sub-pixel electrode; a second switching element connected to the first gate line, the data line, and the second sub-pixel electrode; a third switching element connected to the transformation gate line and the second switching element; a transformation capacitor including a first terminal connected to the second gate line and a second terminal connected to the third switching element, the method including applying gate-on voltage Von to a first gate line to charge the first liquid crystal capacitor and the second liquid crystal capacitor to a first voltage and the second liquid crystal capacitor; applying the gate-on voltage Von to the transformation gate line to allow the second liquid crystal capacitor and the transformation capacitor to share charge; and applying gate-off voltage Voff to the transformation gate line to charge the second liquid crystal capacitor to the second voltage, wherein a second period where the gate-on voltage Von is applied to the transformation gate line starts after the first period where the gate-on voltage Von is applied to the first gate line is completed, and the gate-off voltage Voff is applied to the second gate line in the second period.

In one exemplary embodiment, the second voltage may be substantially lower than the first voltage.

In one exemplary embodiment, the second gate line may be a gate line continued to the first gate line.

In one exemplary embodiment, periods of consecutive gate lines of the plurality of gate lines to which the gate-on voltage Von is applied may overlap each other.

The exemplary embodiments according to the present invention provide the LCD capable of securing the transmittance, substantially improving the visibility, and securing a gate driving margin and the driving method thereof.

BRIEF DESCRIPTION OF THE DRAWINGS

The above and other aspects, advantages and features of this disclosure will become more apparent by describing in further detail embodiments thereof with reference to the accompanying drawings, in which.

DETAILED DESCRIPTION OF THE INVENTION

Figure 1:
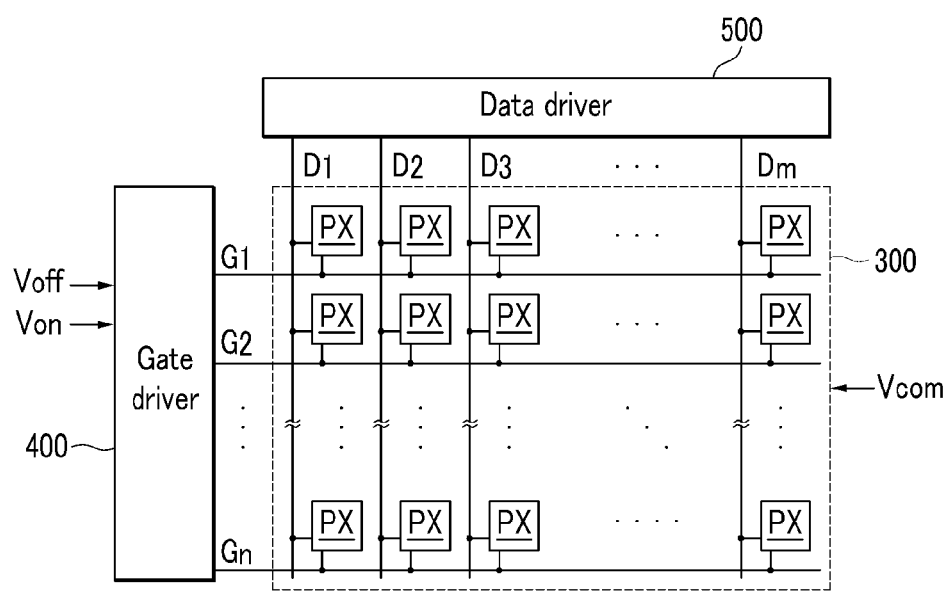
FIG. 1 is a block diagram of an exemplary embodiment of a liquid crystal display ("LCD") according to the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., may be exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, an exemplary embodiment of a liquid crystal display ("LCD") according to the present invention will be described with reference to FIGS. 1 and 2.

Figure 2:
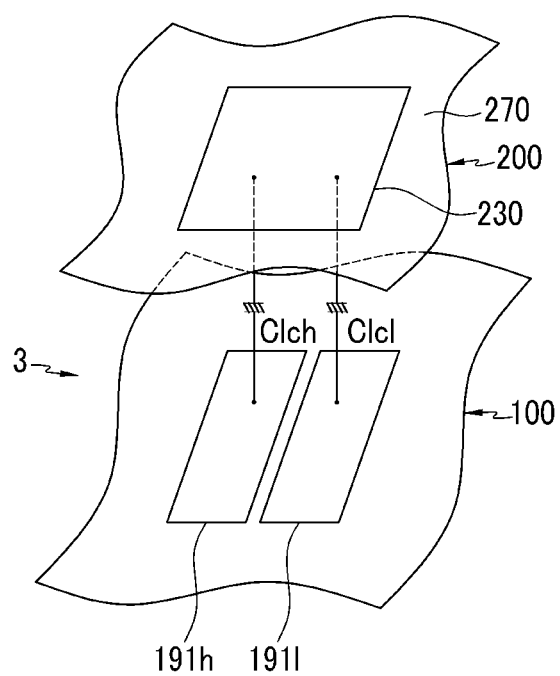
FIG. 2 is an equivalent circuit diagram showing an exemplary embodiment of a structure and two sub-pixels of the LCD according to the present invention.

FIG. 1 is a block diagram of an exemplary embodiment of an LCD according to the present invention, and FIG. 2 is an equivalent circuit diagram showing a structure and two sub-pixels of the LCD according to the present invention.

Referring to FIG. 1, an exemplary embodiment of the LCD according to the present invention includes a liquid crystal panel assembly 300, a gate driver 400, and a data driver 500.

The liquid crystal panel assembly 300 includes a plurality of signal lines G1-Gn and D1-Dm and a plurality of pixels PX connected thereto and arranged in a substantially matrix form, e.g., arranged in pixel rows and pixel columns.

As shown in FIG. 2, the liquid crystal panel assembly 300 includes a lower display panel 100 and an upper display panel 200 that face each other and a liquid crystal layer 3 interposed therebetween.

The plurality of signal lines G1-Gn and D1-Dm is provided in the lower display panel 100 and includes gate lines G1-Gn and data lines D1-Dm transferring data voltage.

Each of the plurality of pixels pixel PX such as a pixel PX connected to an i-th (where i=1, 2, . . . , n) gate line Gi and a j-th (where j=1, 2, . . . , m) data line Dj, includes first and second sub-pixels, and the first and second sub-pixels each include first and second liquid crystal capacitors Clch and Clcl. The first and second sub-pixels further include a switching element (not shown) connected to the gate lines G1-Gn and the data lines D1-Dm.

The first and second liquid crystal capacitors Clch and Clcl use first and second sub-pixel electrodes 191h and 191l of the lower display panel 100 and a common electrode 270 of the upper display panel 200 as two terminals, respectively, and the liquid crystal layer 3 between the first and second sub-pixel electrodes 191h and 191l and the common electrode 270 serves as a dielectric layer. The first and second sub-pixel electrodes 191h and 191l are isolated from each other and form one pixel electrode. The common electrode 270 is disposed on the upper display panel 200 and receives a common voltage Vcom. The liquid crystal layer 3 has negative dielectric anisotropy and liquid crystal molecules of the liquid crystal layer 3 may be aligned so that a major axis thereof is substantially vertical to surfaces of the two display panels 100 and 200, in a state where there is no electric field. In one exemplary embodiment, unlike the exemplary embodiment of FIG. 2, the common electrode 270 may be disposed on the lower display panel 100.

Meanwhile, in order to implement color display, the pixel PX inherently displays one of primary colors (i.e., spatial division) or each pixel PX alternately displays primary colors over time (i.e., temporal division), such that a desired color is recognized by a spatial and temporal sum of the primary colors. An exemplary embodiment of the primary colors may include three primary colors, such as red, green, and blue, for example. As an exemplary embodiment of the spatial division, FIG. 2 shows the exemplary embodiment where each pixel PX includes a color filter 230 displaying one of the primary colors in a region of the upper display panel 200. In one exemplary embodiment, unlike the exemplary embodiment of FIG. 2, the color filter 230 may be formed on or under the sub-pixel electrode 191h and 191l of the lower display panel 100.

A pair of polarizers (not shown) may be provided on an outer surface of the display panels 100 and 200, respectively, wherein polarization axes of the polarizers may be orthogonal to each other.

Referring back to FIG. 1, the data driver 500 is connected to the data lines D1-Dm of the liquid crystal panel assembly 300 and applies data voltage to the data lines D1-Dm.

The gate driver 400 is connected to the gate lines G1-Gn of the liquid crystal panel assembly 300 and applies a gate signal consisting of a combination of a gate-on voltage Von capable of turning-on a switching element and a gate-off voltage Voff capable of turning-off the switching element to the gate lines G1 to Gn.

Figure 3:
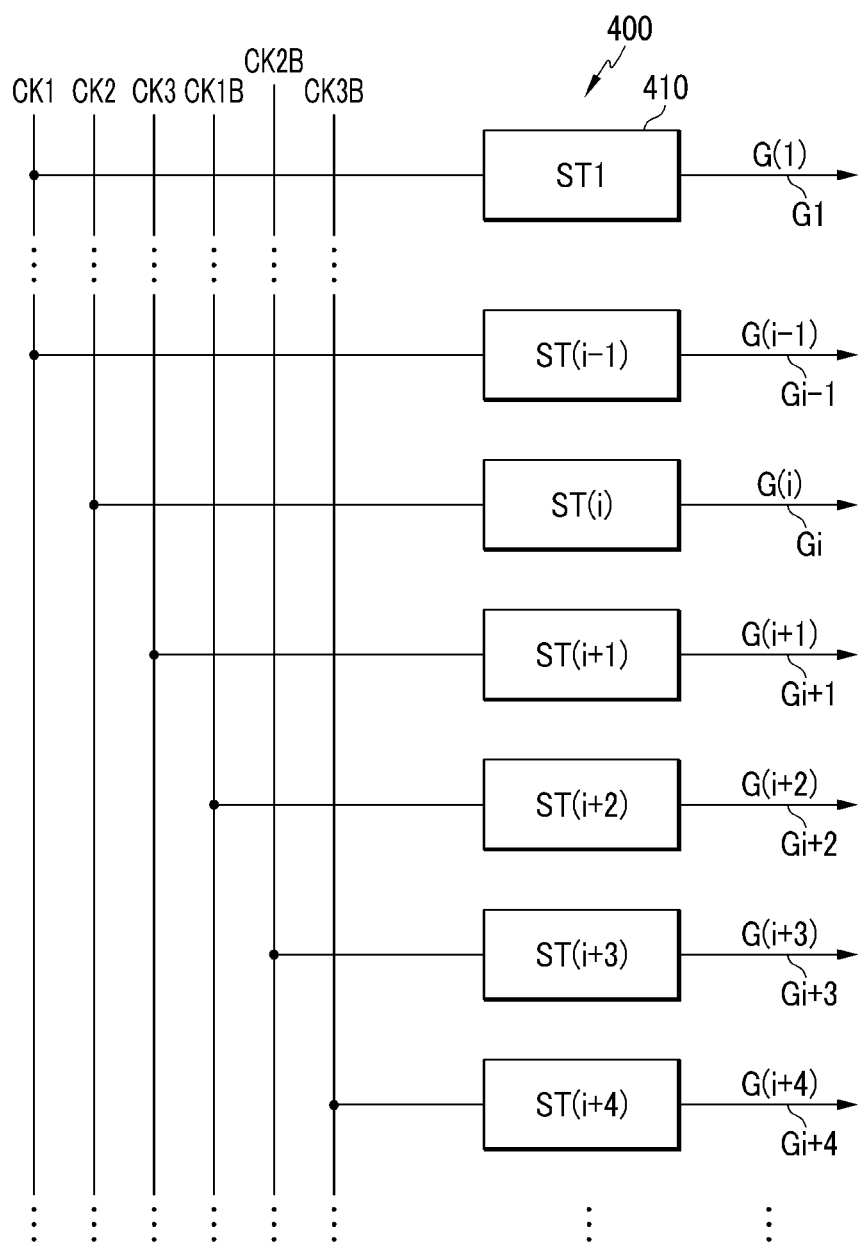
FIG. 3 is a block diagram of an exemplary embodiment of a gate driver according to the present invention.
Figure 4:
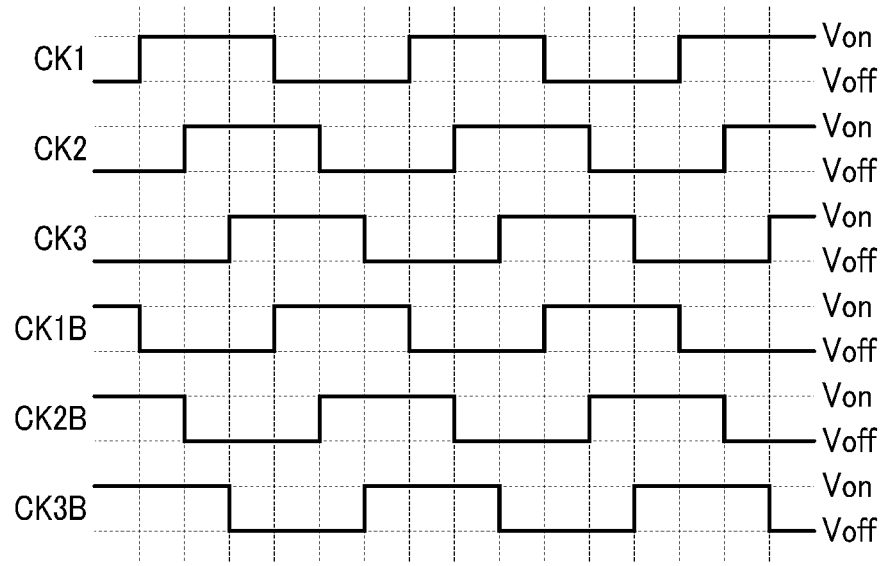
FIG. 4 is a waveform diagram of a clock signal input to the gate driver.
Figure 5:
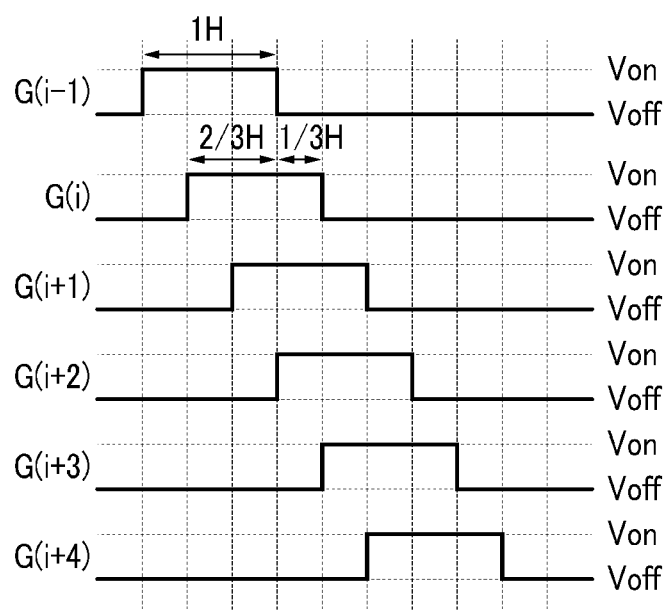
FIG. 5 is a waveform diagram of a gate signal output from the gate driver.

FIG. 3 is a block diagram of an exemplary embodiment of a gate driver 400, and FIG. 4 is a waveform diagram of an exemplary embodiment of a clock signal input to the gate driver 400, and FIG. 5 is a waveform diagram of an exemplary embodiment of a gate signal output from the gate driver according to the present invention.

Referring to FIG. 3, the gate driver 400 is a shift register including a plurality of stages 410 each connected to gate lines G1, . . . , Gi-1, Gi, . . . , Gi+4, . . . , respectively. The plurality of stages 410 receives clock signals CK1, CK2, CK3, CK1B, CK2B, and CK3B and outputs gate signals [G1, . . . , Gi-1, . . . , Gi+4, . . . ].

For convenience of explanation, FIG. 3 shows only the clock signals as a signal received in the plurality of stages, but the plurality of stages may receive a scanning start signal STV, gate-off voltage Voff, and various other signals, in addition to the clock signals.

Referring to FIG. 4, a magnitude of voltage corresponding to a high level of the clock signals CK1, CK2, CK3, CK1B, CK2B, and CK3B is the same as the gate-on voltage Von and a magnitude of voltage corresponding to a low level is the same as the gate-off voltage Voff. The clock signals CK1, CK2, CK3, CK1B, CK2B, and CK3B have a duty ratio of about 50 percent (%) and a period of 2H and sequentially have a phase difference of about 60 degrees (°). The clock signals CK1, CK2, and CK3 and the clock signals CK1B, CK2B, and CK3B have a phase difference of about 180°.

Referring back to FIG. 3, the stages [ST(i-1), ST(i), ST(i+4)] receive the clock signals CK1, CK2, CK3, CK1B, CK2B, and CK3B. In other words, a subsequent stage receives a clock signal delayed by about 60° compared to a clock signal received in a previous stage. The plurality of stages 410 generates the gate signal based on the input clock signal.

Referring to FIG. 5, the i-1-th stage [ST(i-1)] to i+4-th stage [ST(i+4)] sequentially generate the gate signals [Gi-1, . . . , Gi+4]. The generated gate signals [Gi-1, . . . , Gi+4] each have a width of 1H in a high period where the gate-on voltage Von is applied, and a high period of the subsequent gate signal overlaps by ⅔H with a high period of the previous gate signal.

When the gate-on voltage Von is applied to the i+1-th gate line Gi+1 during a first ⅓H part of the 1H period, the gate-on voltage Von is also applied to the i−1-th gate line Gi−1 and i-th gate line Gi. In this case, the data voltage of the pixel connected to the i−1-th gate line Gi−1 is applied to the data line. Therefore, the data voltage of other pixels is previously charged in the pixel connected to the i-th gate line Gi and the pixel connected to the i+1-th gate line Gi+1.

When the gate-on voltage Von is applied to the i+1-th gate line Gi+1 during a second ⅓H part of the 1H period, the gate-on voltage Von is also applied to the i-th gate line Gi and i+2-th gate line Gi+2. In this case, the data voltage of the pixel connected to the i-th gate line Gi is applied to the data line. Therefore, the data voltage of the other pixel is previously charged in the pixel connected to the i+1-th gate line Gi+1 and the pixel connected to the i+2-th gate line Gi+2.

When the gate-on voltage Von is applied to the i+1-th gate line Gi+1 during a last ⅓H part of the 1H period, the gate-on voltage Von is also applied to the i+2-th gate line Gi+2 and the i+3-th gate line Gi+3. In this case, the data voltage of the pixel connected to the i+1-th gate line Gi+1 is applied to the data line. Therefore, the pixel connected to the i+1-th gate line Gi+1 charges its own data voltage.

In other words, the pixel connected to the i+1-th gate line Gi+1 previously charges the data voltage of the other pixel during a first ⅔H part of the 1H period where the gate-on voltage Von is applied to the i+1-th gate line Gi+1, and charges its own data voltage during the last ⅓H part of the 1H period.

As described above, the data voltage of the other pixels may be applied to the pixel as a previous charge voltage during a predetermined time prior to applying the data voltage to the pixel by overlapping a period where the gate-on voltage is applied to the consecutive gate lines. The liquid crystal molecules are already aligned to some degree by previously charging the liquid crystal capacitor of the pixel. Thereby, the difference between a current voltage and a targeted voltage of the liquid crystal capacitor becomes relatively small, thereby making it possible to reach the targeted voltage within a substantially short time.

FIGS. 3 to 5 show the exemplary embodiment of an overlapping period of ⅔H where the gate-on voltage Von is applied to consecutive gate lines, but the overlapping period is not limited thereto. In one exemplary embodiment, unlike the above mentioned exemplary embodiment, periods of the consecutive gate lines to which the gate-on voltage Von is applied may not overlap with each other.

The exemplary embodiment of the LCD according to the present invention will be further described with reference to FIG. 6 together with FIGS. 1 and 2 described above.

Figure 6:
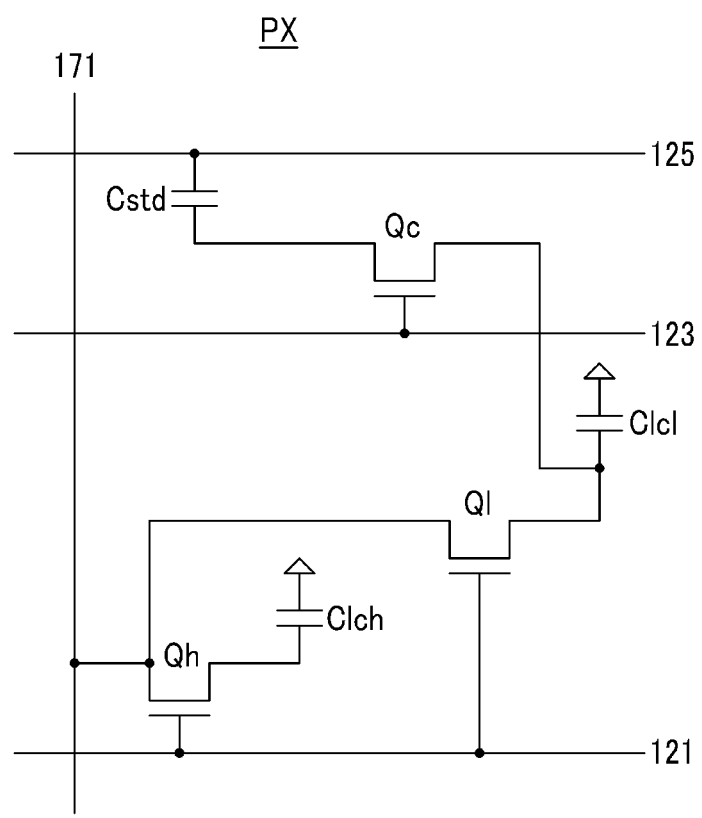
FIG. 6 is an equivalent circuit diagram of an exemplary embodiment of one pixel of the LCD according to the present invention.

FIG. 6 is an equivalent circuit diagram for an exemplary embodiment of one pixel of the LCD according to the present invention.

Referring to FIG. 6, the exemplary embodiment of the LCD according to the present invention includes a signal line including a first gate line 121, a transformation gate line 123, a second gate line 125, and a data line 171 and the plurality of pixels PX connected thereto.

The pixel PX includes a first switching element Qh, a second switching element Ql, a third switching element Qc, a first liquid crystal capacitor Clch, a second liquid crystal capacitor Clcl, and a transformation capacitor Cstd.

The first switching element Qh and the second switching element Ql may be a three terminal element, such as a thin film transistor ("TFT"), for example, included in the lower display panel 100. A control terminal thereof is connected to the first gate line 121, an input terminal is connected to the data line 171, and an output terminal of the first switching element Qh is connected to the first liquid crystal capacitor Clch and an output terminal of the second switching element Ql is connected to the second liquid crystal capacitor Clcl, respectively.

The third switching element Qc is also a three terminal element such as a TFT, for example, included in the lower display panel 100. A control terminal is connected the transformation gate line 123, and an input terminal is connected to the output terminal of the second switching element Ql, and an output terminal is connected to the transformation capacitor Cstd.

The transformation capacitor Cstd is connected to the output terminal of the third switching element Qc and the second gate line 125, and is formed by overlapping the second gate line 125 and the output terminal of the third switching element Qc, having an insulator therebetween.

The first liquid crystal capacitor Clch and the second liquid crystal capacitor Clcl were already described above and therefore, the detailed description thereof may be omitted.

The exemplary embodiment of the operation of the LCD according to the present invention will be described with reference to FIG. 7 together with FIGS. 1 to 6 described above.

Figure 7:
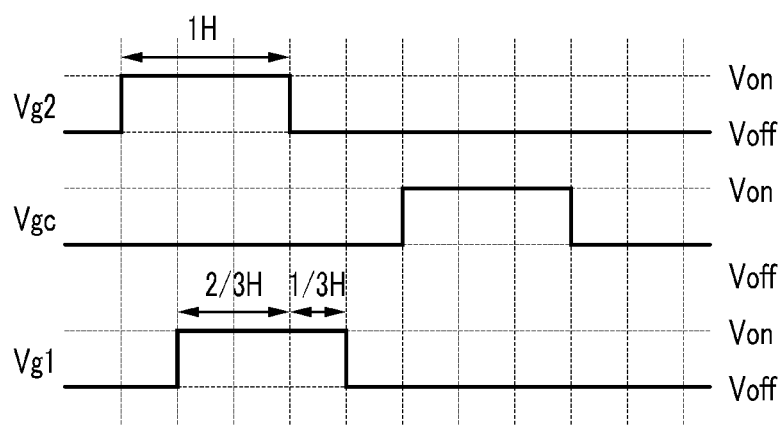
FIG. 7 is a waveform diagram showing an exemplary embodiment of a gate signal Vg1 of a first signal line 121, a gate signal Vgc of a transformation gate line 123, and a gate signal Vg2 of a second gate line 125 in the LCD shown in FIG. 6.

FIG. 7 is a waveform diagram showing an exemplary embodiment of a gate signal Vg1 of a first signal line 121, a gate signal Vgc of the transformation gate line 123, and a gate signal Vg2 of a second gate line 125 in the embodiment of the LCD shown in FIG. 6.

Referring to FIG. 7, a period where the gate signal Vg1 of the first gate line 121 is the gate-on voltage Von and a period where the gate signal Vg2 of the second gate line 125 is the gate-on voltage Von overlap each other by ⅔H. The gate signal Vg1 applied to the first gate line 121 is converted into the gate-off voltage Voff, then after ⅓H, the gate signal Vgc applied to the transformation gate line 123 becomes the gate-on voltage Von. In other words, the period where the gate-on voltage Von is applied to the first gate line 121 and the period where the gate-on voltage Von is applied to the transformation gate line 123 do not overlap each other. The gate-off voltage Voff is applied to the second gate line 125 during the period where the gate-on voltage Von is applied to the transformation gate line 123.

In one exemplary embodiment, the first gate line 121, the second gate line 125, and the transformation gate line 123 may be the i-th gate line Gi, the i−1-th gate line Gi−1, the i+4-th gate line Gi+4 of FIG. 3, respectively. In the above mentioned exemplary embodiment, the gate signals Vg1, Vg2, and Vgc each are the gate signals [Gi, Gi−1, Gi+4] of FIG. 5, respectively.

When the gate signal Vg1 applied to the first gate line 121 becomes the gate-on voltage Von, the first switching element Qh and the second switching element Ql connected thereto are turned-on.

Therefore, the data voltage of the data line 171 is similarly applied to the first and second sub-pixel electrodes 191*h* and 191*l* through the turned-on first and second switching elements Qh and Ql. Since the first and second liquid crystal capacitors Clch and Clcl are charged by the difference between the common voltage Vcom of the common electrode 270 and a voltage of the first and second sub-pixel electrodes 191*h* and 191*l*, such that a charging voltage of the first liquid crystal capacitor Clch and a charging voltage of the second liquid crystal capacitor Clcl are also equal to each other. In this case, the gate signal Vgc applied to the transformation gate line 123 is the gate-off voltage Voff.

When the gate signal Vg1 applied to the first gate line 121 becomes the gate-off voltage Voff, the first and second switching elements Qh and Ql connected to the first gate line 121 turned-off and the first liquid crystal capacitor Clch and the second liquid crystal capacitor Clcl is fully charged with voltage.

The gate signal Vg1 applied to the first gate line 121 is converted into the gate-off voltage Voff, then after ⅓H, the gate signal Vgc applied to the transformation gate line 123 is the gate-on voltage Von and the third switching element Qc is turned-on.

While the gate signal Vgc applied to the transformation gate line 123 is the gate-on voltage Von, the second sub-pixel electrode 191l is connected to the first terminal of the transformation capacitor Cstd through the turned-on third switching element Qc. In this case, the gate signal Vg2 applied to the second gate line 125 becomes the gate-off voltage, such that the second terminal of the transformation capacitor Cstd maintains the gate-off voltage Voff.

Therefore, the charge of the second sub-pixel electrode 191l connected to the output terminal of the second switching element Ql flows into the transformation capacitor Cstd, such that the voltage of the second liquid crystal capacitor Clcl falls. As described above, the second liquid crystal capacitor Clcl and the transformation capacitor Cstd share charge, such that the voltage of the second liquid crystal capacitor Clcl falls.

In particular, when the LCD is driven by a frame inversion, an exemplary embodiment where the data voltage having the positive (+) polarity with respect to the common voltage Vcom is applied to the data line 171 in the current frame will be described by way of example. After the previous frame ends, a negative (−) charge is collected in the transformation capacitor Cstd, such that a positive (+) charge of the second sub-pixel electrode 191l flows into the transformation capacitor Cstd through the third switching element Qc and the negative (−) charge of the transformation capacitor Cstd flows into the second sub-pixel electrode 191l when the third switching element Qc is turned-on in the current frame, thereby reducing a voltage of the second sub-pixel electrode 191l. When the third switching element Qc is turned-on in the state where a negative (−) charge is reversely changed in the second sub-pixel electrode 191l in the subsequent frame, the negative (−) charge of the second sub-pixel electrode 191l flows into the transformation capacitor Cstd, such that the negative (−) charge is collected in the transformation capacitor Cstd and the voltage of the second liquid crystal capacitor Clcl falls.

As described above, a side visibility of the LCD can be substantially improved by making the charging voltage of the first and second liquid crystal capacitors Clch and Clcl different.

Figure 8:
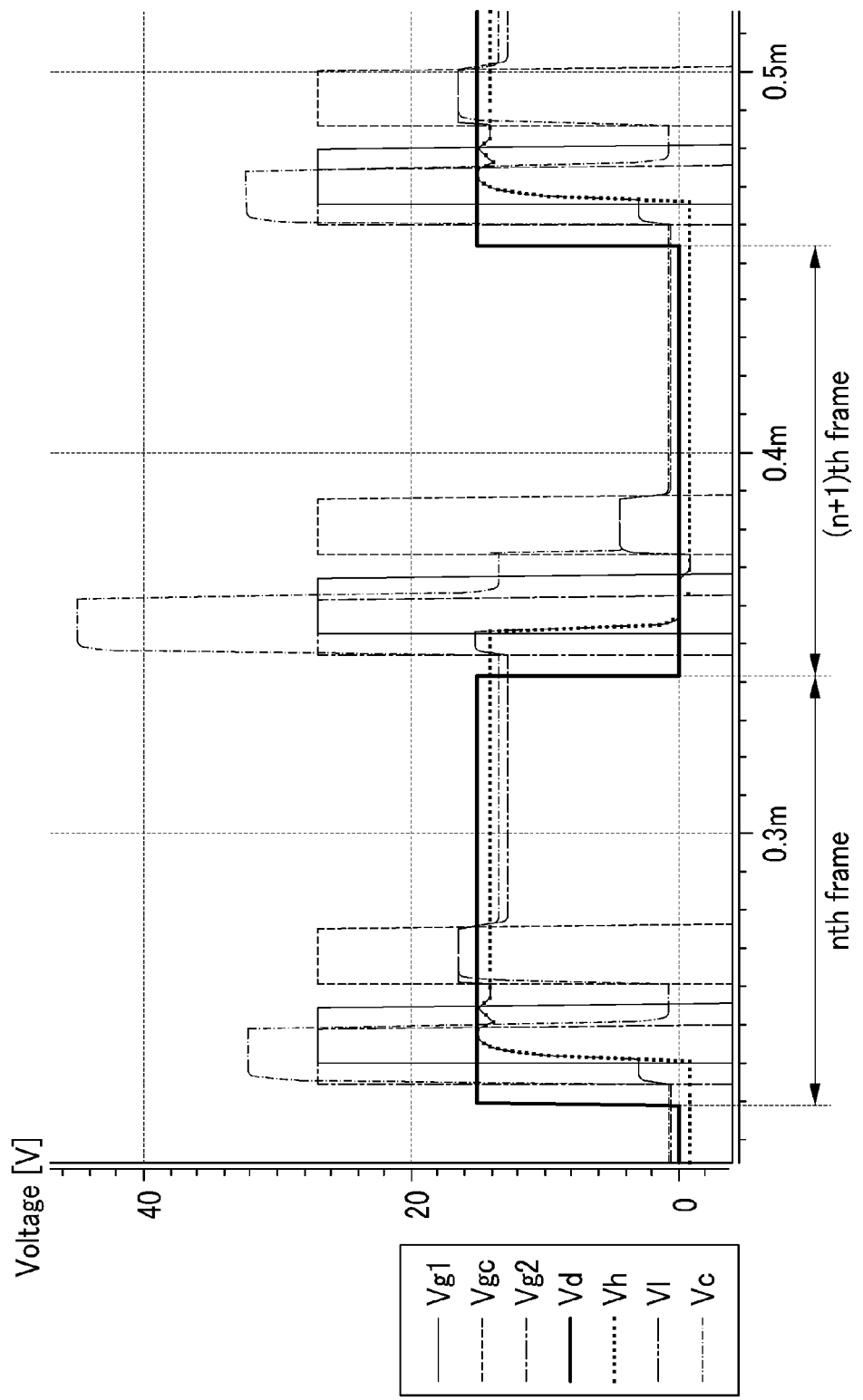
FIG. 8 is a waveform diagram showing a data voltage Vd, voltages Vh and Vl of first and second sub-pixel electrodes 191h and 191I, and a first terminal voltage Vc of a transformation capacitor Cstd when applying the gate signal Vg1 of the first gate line 121, the gate signal Vgc of the transformation gate line 123, and the gate signal Vg2 of the second gate line 125 as shown in FIG. 7, in the LCD device shown in FIG. 6.

FIG. 8 is a waveform diagram showing a data voltage Vd, voltages Vh and Vl of first and second sub-pixel electrodes 191h and 191l, and a first terminal voltage Vc of a transformation capacitor Cstd in the LCD device shown in FIG. 6 when applying the gate signal Vg1 of the first gate line 121, the gate signal Vgc of the transformation gate line 123, and the gate signal Vg2 of the second gate line 125 as shown in FIG. 7.

Referring to FIG. 8, the LCD is driven by the frame inversion. The data voltage Vd having a positive polarity with respect to the common voltage Vcom is applied to the data line 171 based on the common voltage Vcom in a n-th frame and the data voltage Vd having a negative polarity with respect to the common voltage Vcom is applied to the data line 171 in a n+1-th frame. In FIG. 8, the data voltage Vd maintains a consistent value during one frame but this is for convenience of explanation.

First, an operation at the n-th frame will be described.

Since the second terminal of the transformation capacitor Cstd is connected to the second gate line 125, when the gate signal Vg2 of the second gate line 125 is converted from the gate-off voltage Voff to the gate-on voltage Von, the voltage Vc of the first terminal of the transformation capacitor Cstd also rises by an increase in a voltage amplitude of the gate signal Vg2. In this case, the voltage Vc of the first terminal of the transformation capacitor Cstd may be about 32V. When the gate signal Vg2 is converted from the gate-on voltage Von to the gate-off voltage Voff, the voltage Vc of the first terminal of the transformation capacitor Cstd also falls by a decrease in a voltage amplitude of the gate signal Vg2. In this case, the gate-off voltage Voff may be between about −7V and about −8V.

Where the gate signal Vg1 of the first gate line 121 is the gate-on voltage Von, the voltages Vh and Vl of the first and second sub-pixel electrodes 191h and 191l are similarly converted into the data voltage Vd. The first and second liquid crystal capacitors Clch and Clcl are charged by a difference between the common voltage Vcom of the common electrode 270 and each of the voltages Vh and Vl of the first and second sub-pixel electrodes 191h and 191l.

When the gate signal Vg1 of the first gate line 121 is converted into the gate-off voltage Voff, the voltage Vh of the first sub-pixel electrode 191h slightly falls and the voltage thereof is then maintained. In this case, the voltage Vh of the first sub-pixel electrode 191h may be about 14.1V.

When the gate signal Vgc applied to the transformation gate line 123 is converted into the gate-on voltage Von, the second sub-pixel electrode 191l is connected to the first terminal of the transformation capacitor Cstd through the turned-on third switching element Qc. The voltage Vl of the second sub-pixel electrode 191l and the voltage Vc of the first terminal of the transformation capacitor Cstd rise to be substantially equal to each other and the second liquid crystal capacitor Clcl and the transformation capacitor Cstd share charge.

When the gate signal Vgc to the transformation gate line 123 is converted into the gate-off voltage Voff, the voltage Vl of the second sub-pixel electrode 191l and the voltage Vc of the first terminal of the transformation capacitor Cstd slightly fall and the voltage thereof is then maintained. In this case, the voltage Vl of the second sub-pixel electrode 191l may be about 12.8V and the voltage Vc of the first terminal of the transformation capacitor Cstd may be about 13.5V.

After the charge share of the second liquid crystal capacitor Clcl and the transformation capacitor Cstd, the voltage charged in the second liquid crystal capacitor Clcl further falls than the voltage charged in the first liquid crystal capacitor Clch.

Next, the operation at the n+1-th frame will be described.

When the gate signal Vg2 of the second gate line 125 is converted from the gate-off voltage Voff to the gate-on voltage Von, the voltage Vc of the first terminal of the transformation capacitor Cstd also rises by an increase in the voltage amplitude of the gate signal Vg2. In this case, the voltage Vc of the first terminal of the transformation capacitor Cstd may be about 45V. When the gate signal Vg2 is converted from the gate-on voltage Von to the gate-off voltage Voff, the voltage Vc of the first terminal of the transformation capacitor Cstd also falls by a decrease in the voltage amplitude of the gate signal Vg2.

While the gate signal Vg1 of the first gate line 121 is the gate-on voltage Von, the voltage Vh and Vl of the first and second sub-pixel electrodes 191h and 191l are similarly converted into the data voltage Vd.

When the gate signal Vg1 of the first gate line 121 is converted into the gate-off voltage Voff, the voltage Vh of the first sub-pixel electrode 191h slightly falls and the voltage thereof is then maintained. In this case, the voltage Vh of the first sub-pixel electrode 191h may be about −0.86V.

When the gate signal Vgc applied to the transformation gate line 123 is converted into the gate-on voltage Von, the voltage Vl of the second sub-pixel electrode 191l rises [E1] and the voltage Vc of the first terminal of the transformation capacitor Cstd falls, such that they are equal to each other.

When the gate signal Vgc to the transformation gate line 123 is converted into the gate-off voltage Voff, the voltage Vl of the second sub-pixel electrode 191l and the voltage Vc of the first terminal of the transformation capacitor Cstd slightly fall and the voltage thereof is then maintained. In this case, the voltage Vl of the second sub-pixel electrode 191l may be about 0.63V and the voltage Vc of the first terminal of the transformation capacitor Cstd may be about 0.77V.

After the charge of the second liquid crystal capacitor Clcl and the transformation capacitor Cstd is shared, the voltage charged in the second liquid crystal capacitor Clcl further falls than the voltage charged in the first liquid crystal capacitor Clch.

Next, the LCD and the manufacturing method thereof according to the exemplary embodiment of the present invention will be described with reference to FIGS. 9 and 10.

Figure 9:
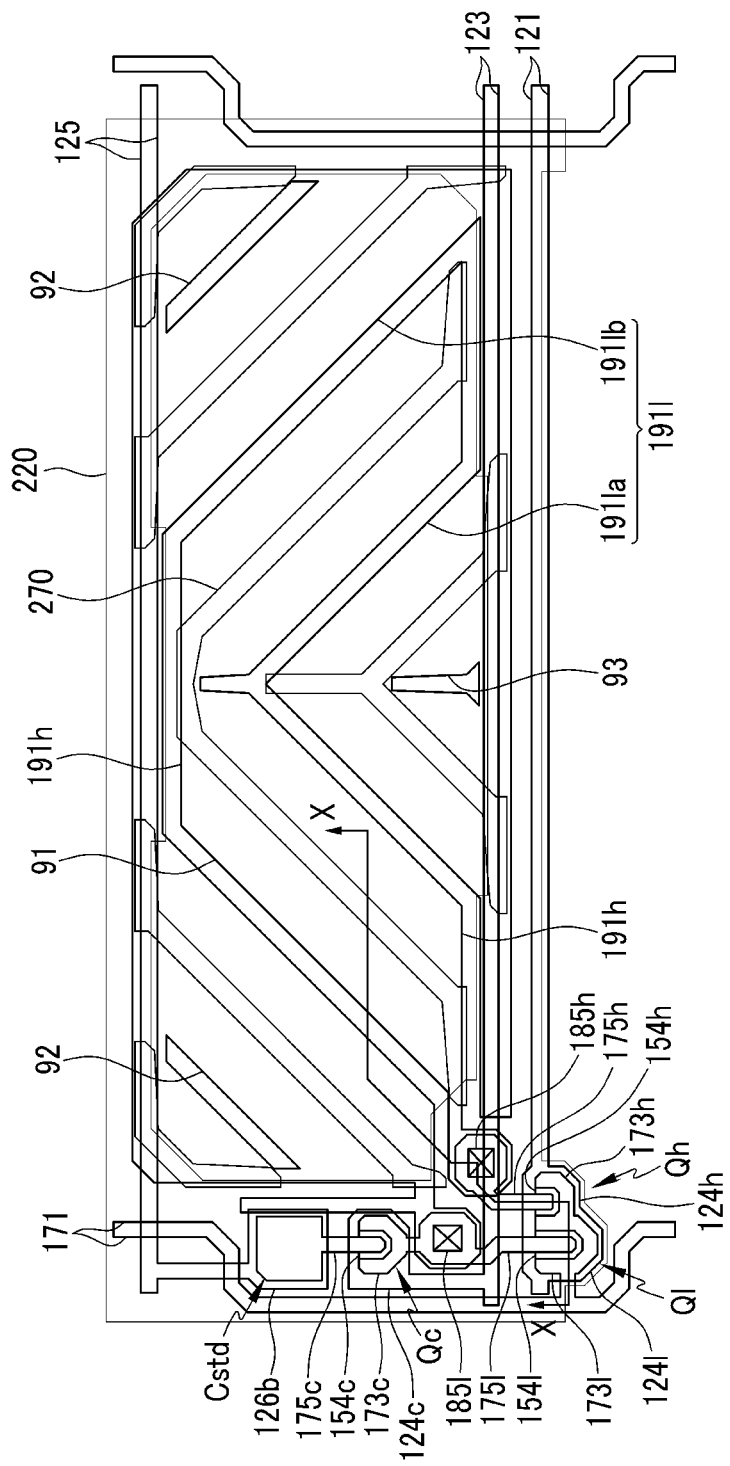
FIG. 9 is a schematic view showing an exemplary embodiment of a disposition of the LCD shown in FIG. 6.
Figure 10:
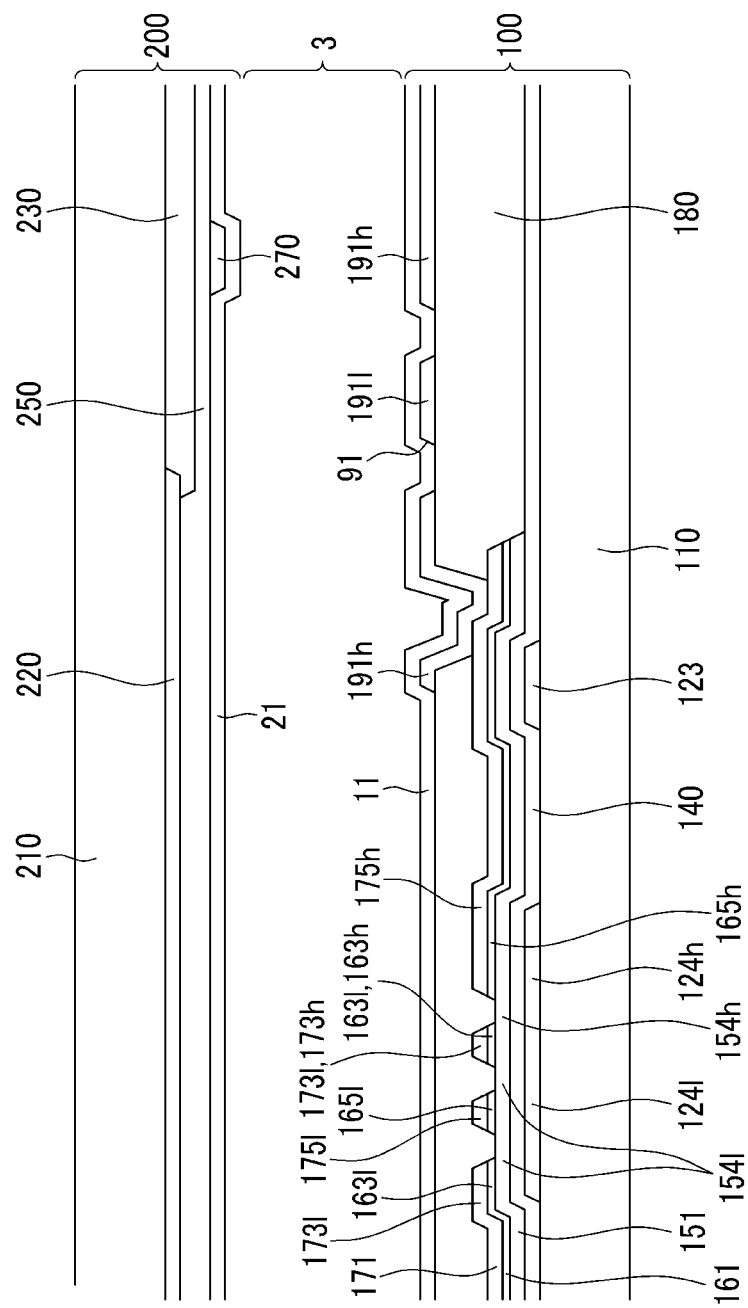
FIG. 10 is a cross-sectional view of an LCD taken along line X-X of FIG. 9.

FIG. 9 is a schematic view showing an exemplary embodiment of a disposition of the LCD shown in FIG. 6 and FIG. 10 is a cross-sectional view of the LCD taken along line X-X of FIG. 9.

The present exemplary embodiment of the LCD according to the present exemplary embodiment includes the lower display panel 100 and the upper display panel 200 that faces each other and the liquid crystal layer 3 inserted between two display panels 100 and 200. The polarizer (not shown) may be provided on the outer surfaces of the display panels 100 and 200.

First, the lower display panel 100 will be further described.

A plurality of gate conductors including the plurality of the first gate lines 121, the plurality of transformation gate lines 123, and the second gate lines 125 are formed on the insulating substrate 110.

The first gate line 121, the second gate line 125, and the transformation gate line 123 mainly extend in a substantially horizontal direction and transfer the gate signals. The first gate line 121 includes a first gate electrode 124h and a second gate electrode 124l substantially vertically protruded and the transformation gate line 123 includes a third gate electrode 124c protruded up. The first gate electrode 124h and the second gate electrode 124l are connected to each other, thereby forming one protruding portion.

The second gate line 125 includes an extending portion 126b protruded down.

A gate insulating layer 140 is disposed on the gate conductors 121, 123, and 125.

A plurality of linear semiconductors 151 including amorphous or crystalline silicon, for example, are formed on the gate insulating layer 140. The linear semiconductor 151 includes first and second semiconductors 154h and 154l that mainly extend in a substantially vertical direction, extend toward the first and second gate electrodes 124h and 124l, and are connected to each other and a third semiconductor 154c that is connected to the second semiconductor 154l.

A plurality of linear ohmic contacts 161 is disposed on the linear semiconductor 151, a pair of ohmic contacts 163h and 165h is formed on the first semiconductor 154h, and a pair of ohmic contacts 163l and 165l is formed on the second semiconductor 154l. A pair of ohmic contacts (not shown) is also formed on the third semiconductor 154c. The ohmic contacts 163l and 163h are connected to the ohmic contact stripe 161.

Data conductors including the plurality of data lines 171, a plurality of first drain electrodes 175h, a plurality of second drain electrode 175l, a plurality of third source electrodes 173c, and the plurality of third drain electrodes 175c are formed on the ohmic contacts 161, 165h, and 165l, respectively.

The data line 171 intersects with the first gate line 121, the second gate line 125, and transformation gate line 123, transfers the data signals and mainly extends in a vertical direction. Each data line 171 includes a first source electrode 173h and a second source electrode 173l extending toward the first gate electrode 124h and the second gate electrode 124l. The first source electrode 173h and the second source electrode 173l are connected to each other.

The first drain electrode 175h, the second drain electrode 175l, and the third drain electrode 175c include a wide one end portion and the other end portion that is a substantially bar shape. The bar-shaped end portion of the first drain electrode 175h and the second drain electrode 175l are each surrounded partially by the first source electrode 173h and the second source electrode 173l, and the third drain electrode 175c is partially surrounded by the third source electrode 173c. The wide one end portion of the second drain electrode 175l is connected to the third source electrode 173c. The wider end portion of the third drain electrode 175c overlaps with the extending portion 126b of the second gate line 125 to form the transformation capacitor Cstd.

The first/the second/the third gate electrodes 124h/124l/124c, the first/the second/the third source electrodes 173h/173l/173c, and the first/the second/the third drain electrodes 175h/175l/175c forms one switching elements Qh/Ql/Qc that are first/the second/the third TFTs together with the first/the second/the third semiconductors 154h/154l/154c and a channel of the TFT is formed in each of the semiconductors 154h/154l/154c between each of the source electrodes 173h/173l/173c and each of the drain electrodes 175h/175l/175c.

The linear semiconductor 151 including the semiconductors 154h, 154l, and 154c has a substantially same plane shape as that of the data conductors 171, 175h, 175l, and 175c and the ohmic contacts 161, 165h and 165l thereunder, except for a channel region between the source electrodes 173h, 173l, and 173c and the drain electrodes 175h, 175l, and 175c. In other words, an exposed portion while not being covered by the data conductors 171, 175h, 175l, and 175c is provided between the source electrodes 173h, 173l, and 173c and the drain electrodes 175h, 175l, and 175c, in the linear semiconductor 151 including the semiconductor 154h, 154l, and 154c.

A passivation layer 180 is disposed on the data conductors 171, 175h, 175l, and 175c and the exposed semiconductors 154h, 154l, and 154c.

A plurality of contact holes 185h and 185l exposing each of the wide end portion of the first drain electrode 175h and the wide end portion of the second drain electrode 175l is formed on the passivation layer 180.

A pixel electrode 191 is disposed on the passivation layer 180.

Generally, the pixel electrode 191 is an approximately quadrangle shape and includes first and second sub-pixel electrodes 191h and 191l connected to each other, having a gap 91 therebetween. The first sub-pixel electrode 191h is inserted in a substantially center portion of the second sub-pixel electrode 191l and the gap 91 includes one vertical portion and two pair of oblique line portions positioned up and down based a virtual horizontal central line.

The second sub-pixel electrode 191l includes a central electrode 191la and an upper electrode 191lb. The central electrode 191la includes a cutout portion 93 formed in a center thereof in an approximate bar-shape and the upper electrode 191b includes a cutout portion 92.

Sides forming an oblique line portion of the gap 91 and a cutout portion 92 may be oblique to the first gate line 121 and the transformation gate lines 123 and the second gate line 125, that is, form an angle of approximately 45°.

A number of cutout portions may be changed according to design factors, such as a length ratio of the horizontal side and the vertical side of the pixel electrode 191, the kind or characteristics of the liquid crystal layer 3.

An area of the second sub-pixel electrode 191l may be approximately 1.0 times or 2.2 times larger than an area of the first sub-pixel electrode 191h.

The first sub-pixel electrode 191h receives the data voltage from the first drain electrode 175h through the contact hole 185h and the second sub-pixel electrode 191l receives the data voltage from the second drain electrode 175l through the contact hole 185l.

An alignment layer 11 is formed on the first and second sub-pixel electrodes 191h and 191l and passivation layer 180. In one exemplary embodiment, the alignment layer 11 may be a vertical alignment layer.

Next, the upper display panel 200 will be further described.

A light blocking member 220 and a plurality of color filters 230, which are called a black matrix, are formed on the insulation substrate 210 and an overcoat 250 is formed on the light blocking member 220 and the color filter 230.

The common electrode 270 made of a transparent conductor or a metal such as indium-tin-oxide (ITO) and indium-zinc-oxide (IZO) may be formed on the cover layer 250 and an alignment layer 21 may be formed thereon. In one exemplary embodiment, the alignment layer 21 may be a substantially vertical alignment layer.

The liquid crystal layer 3 inserted between the lower display panel 100 and the upper display panel 200 includes the liquid crystal molecule including the dielectric anisotropy and the liquid crystal molecules may be aligned so that a major axis of the liquid crystal molecule is substantially vertical to the surfaces of the two display panels 100 and 200 in the state where there is no electric field.

The first and second sub-pixel electrodes 191h and 191l to which the data voltage is applied generate the electric field together with the common electrode 270 of the upper display panel 200, thereby determining the direction of the liquid crystal molecule of the liquid crystal layer 3 between two electrodes 191 and 270. A change of a degree of polarization of light incident into the liquid crystal layer 3 is changed according a slope of the liquid crystal molecule. The change in polarization represents a change in transmittance according to the polarizer, such that the LCD displays images.

The first sub-pixel electrode 191h and the common electrode 270 form the first liquid crystal capacitor Clch together with the liquid crystal layer 3 therebetween and the second sub-pixel electrode 191l and the common electrode 270 form the second liquid crystal capacitor Clcl together with the liquid crystal layer 3 therebetween, thereby maintaining the applied voltage even after the first and second switching elements Qh and Ql are turned-off.

After the first and second switching elements Qh and Ql are turned-off, the third switching element Qc is turned-on such that the second liquid crystal capacitor Clcl is connected to the transformation capacitor Cstd, thereby reducing the voltage of the second liquid crystal capacitor Clcl. When the voltage of the first liquid crystal capacitor Clch and the voltage of the second liquid crystal capacitor Clcl are different from each other, luminance is also different and when the voltage of the first and second liquid crystal capacitors Clch and Clcl is properly matched, the side visibility can be substantially improved.

As shown in FIG. 7, the first gate line 121 and the second gate line 125 is the i-th gate line Gi and the i−1-th gate line Gi−1 of FIG. 3 and the transformation gate line 123 may be connected to the i+4-th gate line Gi+4. However, the present exemplary embodiment does not limit the first gate line 121, the second gate line 125, and the transformation gate line 123.

After the charging is completed in the second liquid crystal capacitor Clcl by the difference between the data voltage and the common voltage Vcom of the pixel PX common voltage, the third switching element Qc should be turned-on. Therefore, the first period where the gate-on voltage Von is applied to the first gate line 121 and the second period where the gate-on voltage Von is applied to the transformation gate line 123 do not overlap each other. In addition, the second period is preceded by the first period within the frame period. In the second period, the second gate line 125 is applied with the gate-off voltage Voff. In one exemplary embodiment, the second gate line 125 may be the gate line continued to the first gate line 121. In other words, the second gate line 125 may be the gate line immediately after the first gate line 121 or the gate immediately before the first gate line 121.

As shown in FIG. 5, when the periods where the gate-on voltage Von is applied to the consecutive gate lines overlap by ⅔H, if the first gate line 121 is the i-th gate line Gi, the transformation gate line 123 may be one of the i+3-th gate line Gi+3 and the gate line subsequent to the i+3-th gate line Gi+3. If the periods where the gate-on voltage Von is applied to the consecutive gate lines do not overlap, the transformation gate line 123 may be the gate line just subsequent to the first gate line 121. As described above, a gate line that does not overlap with the first gate line 121 while being subsequent to the first gate line 121 may be used as the transformation gate line 123. The gate line to which the gate-off voltage Voff is applied may be the second gate line 125 during the second period where the gate-on voltage Von is applied to the transformation gate line 123. As shown in FIG. 5, when the periods where the gate-on voltage Von is applied to the consecutive gate lines overlap by ⅔H, the first gate line 121 is the i-th gate line Gi and the transformation gate line 123 is the i+4-th gate line Gi+4, the second gate line 125 may be the i−1-th gate line Gi−1 or the i+1-th gate line Gi+1.

Figure 11:
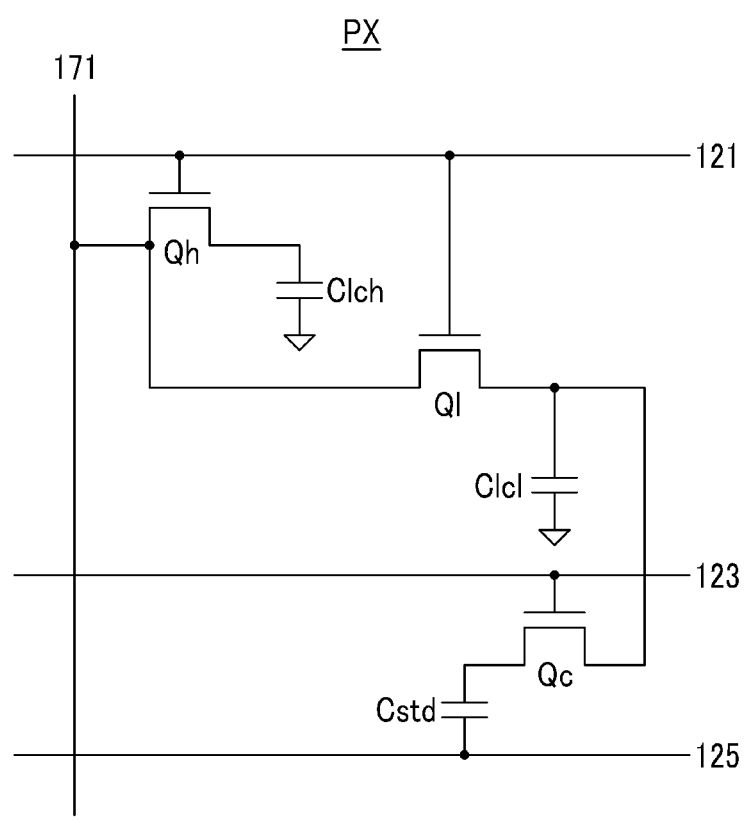
FIG. 11 is an equivalent circuit diagram of another exemplary embodiment of one pixel of an LCD according to the present invention.

FIG. 11 is an equivalent circuit diagram of another exemplary embodiment of one pixel of an LCD according to the present invention.

FIG. 6 shows the exemplary embodiment where the gate line prior to the first gate line 121 is used as the second gate line 125 and FIG. 11 shows an exemplary embodiment where the gate line subsequent to the first gate line is used as the second gate line 125. Except for this, the exemplary embodiment shown in FIG. 11 is substantially same as the exemplary embodiment shown in FIG. 6 and the detailed description thereof will be omitted.

When the first gate line 121 is the i-th gate line Gi, for example, the second gate line 125 may be the i+1-th gate line G+1. As shown in FIG. 5, when the periods where the gate-on voltage Von is applied to the consecutive gate lines overlap by ⅔H, the transformation gate line 123 may be the i+4-th gate line Gi+4.

Figure 12:
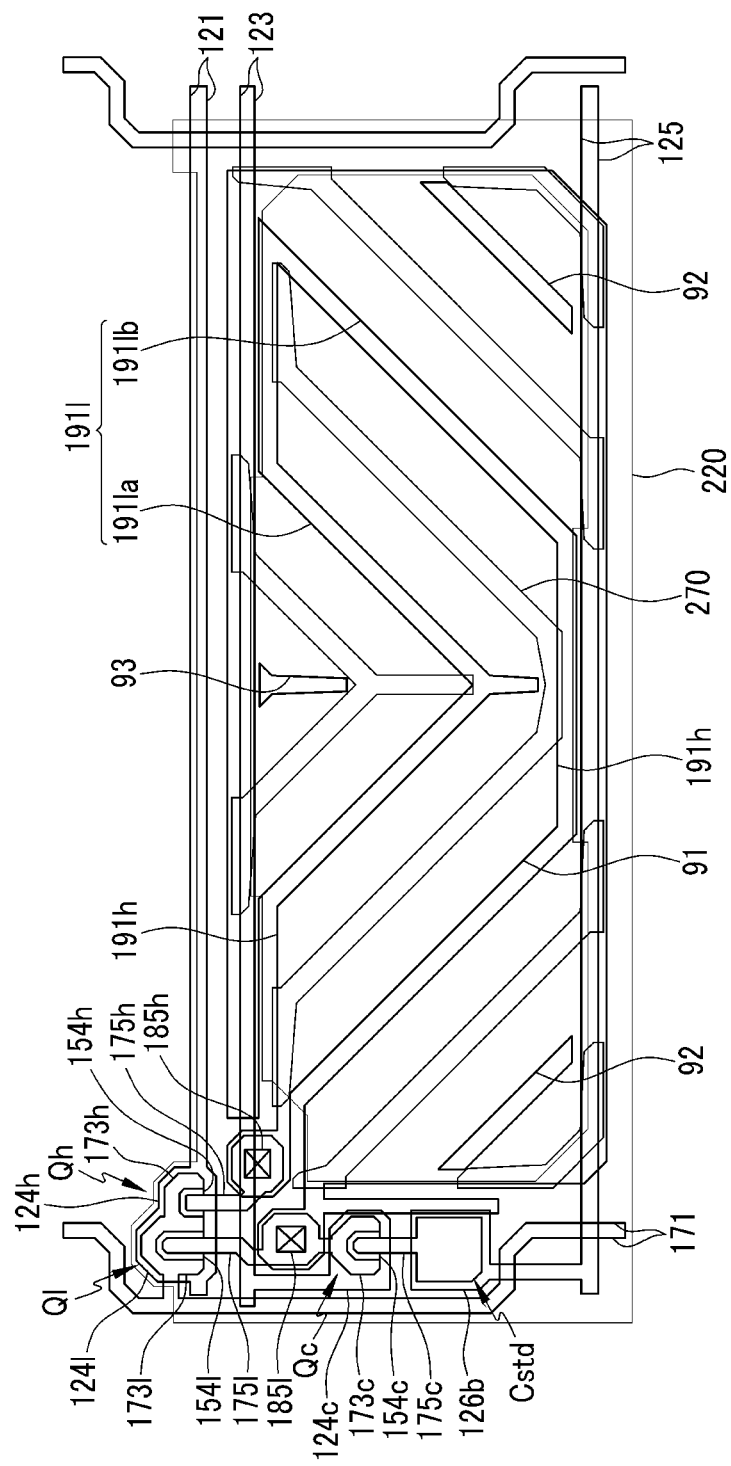
FIG. 12 is a schematic view showing an exemplary embodiment of a disposition of the LCD shown in FIG. 11.

FIG. 12 is a schematic view showing an exemplary embodiment of a disposition of the LCD shown in FIG. 11.

The exemplary embodiment of FIG. 12 is substantially same as the exemplary embodiment of FIG. 9 except that the disposition diagram of FIG. 9 is inverted up and down and therefore, the detailed description thereof will be omitted.

As described above, according to the exemplary embodiments of the present invention, the LCD and the driving method thereof can substantially improve the visibility and secure a gate driving margin while securing the transmittance.

The first period where the gate-on voltage Von is applied to the first gate line 121 and the second period where the gate-on voltage Von is applied to the transformation gate line 123 do not overlap each other, such that the second liquid crystal capacitor Clcl and the transformation capacitor Cstd can share charge and the voltages of the first and second liquid crystal capacitors Clch and Clcl, respectively, are different from each other, such that the visibility can be substantially improved.

In one exemplary embodiment, the transmittance can be secured without adding a signal line using a gate line consecutive to the first gate line 121 as the second gate line 125.

The second gate line 125 is connected to the second terminal of the transformation capacitor Cstd, such that the second terminal of the transformation capacitor Cstd maintains the gate-off voltage Voff that is a negative voltage. This is advantageous in applying an active capacitor.

In addition, the second liquid crystal capacitor Clcl and the transformation capacitor Cstd can share charge even where the pixel is previously charged, by overlapping a period where the gate-on voltage Von is applied to the consecutive gate lines. Therefore, the gate driving margin can be secured.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display, the liquid crystal display comprising:
    a plurality of gate lines which includes a first gate line, a transformation gate line, and a second gate line;
    a data line; and
    a pixel, wherein the pixel includes:
        a first liquid crystal capacitor which includes a first sub-pixel electrode and a common electrode and a second liquid crystal capacitor which includes a second sub-pixel electrode and a common electrode;
        a first switching element connected to the first gate line, the data line, and the first sub-pixel electrode;
        a second switching element connected to the first gate line, the data line, and the second sub-pixel electrode;
        a third switching element connected to the transformation gate line and the second switching element;
        a transformation capacitor which includes a first terminal directly connected to the second gate line and a second terminal connected to the third switching element; and
        wherein a gate-on voltage applied to the first gate line defines a first period and the gate-on voltage applied to the transformation gate line defines a second period, the first and second periods do not overlap each other and, a gate-off voltage is applied to the second gate line during the second period.

2. The liquid crystal display of claim 1, wherein
    the second period is subsequent to the first period within a frame period.

3. The liquid crystal display of claim 2, wherein
    the first switching element and the second switching element are turned-on in the first period, such that the first liquid crystal capacitor and the second liquid crystal capacitor are each charged to a first voltage.

4. The liquid crystal display of claim 3, wherein
    the third switching element is turned-on in the second period, such that the second liquid crystal capacitor and the transformation capacitor share charge.

5. The liquid crystal display of claim 4, wherein
    the second liquid crystal capacitor is charged to the second voltage after the second period.

6. The liquid crystal display of claim 5, wherein
    the second voltage is substantially lower than the first voltage.

7. The liquid crystal display of claim 1, wherein
    the second gate line and the first gate line are consecutive gate lines.

8. The liquid crystal display of claim 7, wherein
    the second gate line is a gate line previous to the first gate line.

9. The liquid crystal display of claim 7, wherein
    the second gate line is a gate line subsequent to the first gate line.

10. The liquid crystal display of claim 1, wherein
    periods of consecutive gate lines of the plurality of gate lines to which the gate-on voltage is each applied overlap each other.

11. The liquid crystal display of claim 10, wherein
    a period where the gate-on voltage is applied to each of the plurality of gate lines is 1H and the periods of consecutive gate lines of the plurality of gate lines to which the gate-on voltage is each applied overlap by ⅔H.

12. The liquid crystal display of claim 11, wherein
    the first gate line is an i-th gate line (where i=2, 3 . . . , n), the second gate line is an i−1-th gate line, and the transformation gate line is an i+4-th gate line.

13. The liquid crystal display of claim 11, wherein
    the first gate line is an i-th gate line (where i=2, 3 . . . , n), the second gate line is an i+1-th gate line, the transformation gate line is an i+4-th gate line.

14. The liquid crystal display of claim 11, wherein
    the gate-on voltage applied to the plurality of gate lines is generated based on a first to sixth clock signals, and the first to sixth clock signals each have a 2H period and sequentially have a phase difference of about 60°.

15. A driving method for a liquid crystal display including a plurality of gate lines which includes a first gate line, a transformation gate line, and a second gate line; a data line, and a pixel, wherein the pixel includes: a first liquid crystal capacitor which includes a first sub-pixel electrode and a common electrode and a second liquid crystal capacitor which includes a second sub-pixel electrode and a common electrode; a first switching element connected to the first gate line, the data line, and the first sub-pixel electrode; a second switching element connected to the first gate line, the data line, and the second sub-pixel electrode; a third switching element connected to the transformation gate line and the second switching element; a transformation capacitor which includes a first terminal directly connected to the second gate line and a second terminal connected to the third switching element, the method comprising:

applying gate-on voltage to a first gate line to charge the first liquid crystal capacitor and the second liquid crystal capacitor with a first voltage;

applying the gate-on voltage to the transformation gate line to allow the second liquid crystal capacitor and the transformation capacitor to share charge; and applying gate-off voltage to the transformation gate line to charge the second liquid crystal capacitor with the second voltage, wherein a second period defining the gate-on voltage applied to the transformation gate line starts after a first period defining the gate-on voltage applied to the first gate line is completed, and the gate-off voltage is applied to the second gate line during the entire second period.

16. The method of claim 15, wherein
the second voltage is substantially lower than the first voltage.

17. The method of claim 15, wherein
the second gate line and the first gate line are consecutive gate lines.

18. The method of claim 15, wherein
periods of consecutive gate lines of the plurality of gate lines to which the gate-on voltage is each applied overlap each other.

19. The liquid crystal display of claim 1, wherein the second period where the gate-on voltage is applied to the transformation gate line during the entire second period does not overlap and is separated from the first period, and the gate-off voltage is applied to the second gate line during the entire second period.

* * * * *